(12) United States Patent
Ito

(10) Patent No.: US 12,398,823 B2
(45) Date of Patent: Aug. 26, 2025

(54) SOLENOID RELIEF VALVE SYSTEM AND CONTROL METHOD OF SOLENOID RELIEF VALVE

(71) Applicant: KYB Corporation, Tokyo (JP)

(72) Inventor: Tatsuo Ito, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 18/689,918

(22) PCT Filed: Mar. 17, 2022

(86) PCT No.: PCT/JP2022/012451
§ 371 (c)(1),
(2) Date: Mar. 7, 2024

(87) PCT Pub. No.: WO2023/175869
PCT Pub. Date: Sep. 21, 2023

(65) Prior Publication Data
US 2025/0129864 A1    Apr. 24, 2025

(51) Int. Cl.
*F16K 31/40* (2006.01)
*F16K 17/02* (2006.01)

(52) U.S. Cl.
CPC ............ *F16K 31/406* (2013.01); *F16K 17/02* (2013.01)

(58) Field of Classification Search
CPC ................................. F16K 31/406; F16K 17/02
See application file for complete search history.

(56) References Cited

U.S. PATENT DOCUMENTS

| | | | | |
|---|---|---|---|---|
| 4,476,890 A | * | 10/1984 | Kawasaki | F16K 17/105 137/493.9 |
| 6,386,834 B1 | | 5/2002 | Kimura et al. | |
| 9,982,615 B2 | * | 5/2018 | Lang | F02D 41/221 |
| 10,378,665 B2 | * | 8/2019 | Sonokawa | F16K 17/0433 |
| 2003/0131889 A1 | * | 7/2003 | Kim | F16K 17/10 137/491 |
| 2018/0195640 A1 | * | 7/2018 | Takeuchi | F16K 31/408 |

FOREIGN PATENT DOCUMENTS

| | | | |
|---|---|---|---|
| JP | H01229180 A | * | 9/1989 |
| JP | H02-256984 A | | 10/1990 |
| JP | 2001-173556 A | | 6/2001 |
| JP | 2009103300 A | * | 10/2008 |
| JP | 2019086110 A | * | 6/2019 |

* cited by examiner

Primary Examiner — Angelisa L. Hicks
(74) Attorney, Agent, or Firm — Rabin & Berdo, P.C.

(57) ABSTRACT

A solenoid relief valve system includes: a solenoid relief valve; and a control unit; wherein the control unit has a dither generating unit configured to generate the dither on a plunger by applying a first dither signal or a second dither signal having different amplitude or frequency from the first dither signal to current to be supplied to a coil, and wherein the dither generating unit is configured to apply the first dither signal to the current to be supplied to the coil during adjustment of a setting pressure, by which the current to be supplied to the coil is caused to be changed, and configured to apply the second dither signal to the current to be supplied to the coil in a state in which the adjustment of the setting pressure is not performed.

6 Claims, 5 Drawing Sheets

SOLENOID RELIEF VALVE SYSTEM AND CONTROL METHOD OF SOLENOID RELIEF VALVE

TECHNICAL FIELD

The present invention relates to a solenoid relief valve system and a control method of a solenoid relief valve.

BACKGROUND ART

JPH2-256984A discloses a solenoid pressure control valve having a setting pressure adjusting solenoid that lowers a setting pressure by reducing a valve port closing force of a poppet exerted with a spring by a magnetic force generated by input of an electric signal. The setting pressure adjusting solenoid has a stator that has a coil that generates the magnetic force by the input of the electric signal and a plunger that is supported by the stator via a rod so as to be freely slidable in the axial direction, and the rod is in contact with the poppet. When a pressure of working fluid acting on the poppet exceeds the setting pressure, the poppet is opened and the working fluid is relieved.

SUMMARY OF INVENTION

With the solenoid pressure control valve described in JPH2-256984A, it is conceivable that a variation is caused on a set pressure that is actually set when the setting pressure of the solenoid pressure control valve is adjusted due to the influence of a static frictional force, etc. acting on a sliding surface of the plunger. In contrast, as described in JP2001-173556A, it is also conceivable to achieve a state in which a dither is applied to the current supplied to the coil, the plunger is caused to vibrate, and a kinetic frictional force acts on the sliding surface of the plunger. However, in this case, because the vibration of the plunger is transmitted to the poppet via the rod, there is a risk in that the operation of the solenoid pressure control valve becomes unstable.

An object of the present invention is to reduce a variation in a set pressure in a solenoid relief valve and stabilize its operation by a solenoid relief valve system.

According to an aspect of the present invention, a solenoid relief valve system includes: a solenoid relief valve having a solenoid portion configured to adjust a setting pressure for opening a valve body by changing a biasing force of a biasing member acting on the valve body; and a control unit configured to control the solenoid relief valve, wherein the solenoid portion has: a coil configured to form a magnetic field by supply of current; and a plunger slidably accommodated in a housing, the plunger being configured such that a thrust force against the biasing force of the biasing member is exerted to the plunger by the magnetic field formed by the coil, the control unit has: a driving control unit configured to supply the current to the coil of the solenoid portion; and a dither generating unit configured to generate dither on the plunger by applying a first dither signal or a second dither signal to the current to be supplied to the coil, the second dither signal having different amplitude or frequency from the first dither signal, and wherein the dither generating unit is configured to apply the first dither signal to the current to be supplied to the coil from the driving control unit during adjustment of the setting pressure, in which the current to be supplied to the coil from the driving control unit is caused to be changed, and configured to apply the second dither signal to the current to be supplied to the coil from the driving control unit in a state in which the adjustment of the setting pressure is not performed.

According to an aspect of the present invention, a control method of a solenoid relief valve having a solenoid portion configured to adjust a setting pressure for opening a valve body by changing a biasing force of a biasing member acting on the valve body is provided. The solenoid portion has: a coil configured to form a magnetic field by supply of current; and a plunger slidably accommodated in a housing, the plunger being configured such that a thrust force against the biasing force of the biasing member is exerted to the plunger by the magnetic field formed by the coil. The control method of the solenoid relief valve includes: a command signal generating step of generating a command signal that is the current to be supplied to the coil based on a desired setting pressure input by an operator; and a current supply step of supplying current to the coil at a current value based on a first dither signal and the command signal during adjustment of the setting pressure, in which the current to be supplied to the coil is caused to be changed, and supplying current to the coil at a current value based on a second dither signal and the command signal in a state in which the adjustment of the setting pressure is not performed, the second dither signal having different amplitude or frequency from the first dither signal.

DESCRIPTION OF EMBODIMENTS

A solenoid relief valve system 100 according to an embodiment of the present invention will be described with reference to the drawings.

Figure 1:
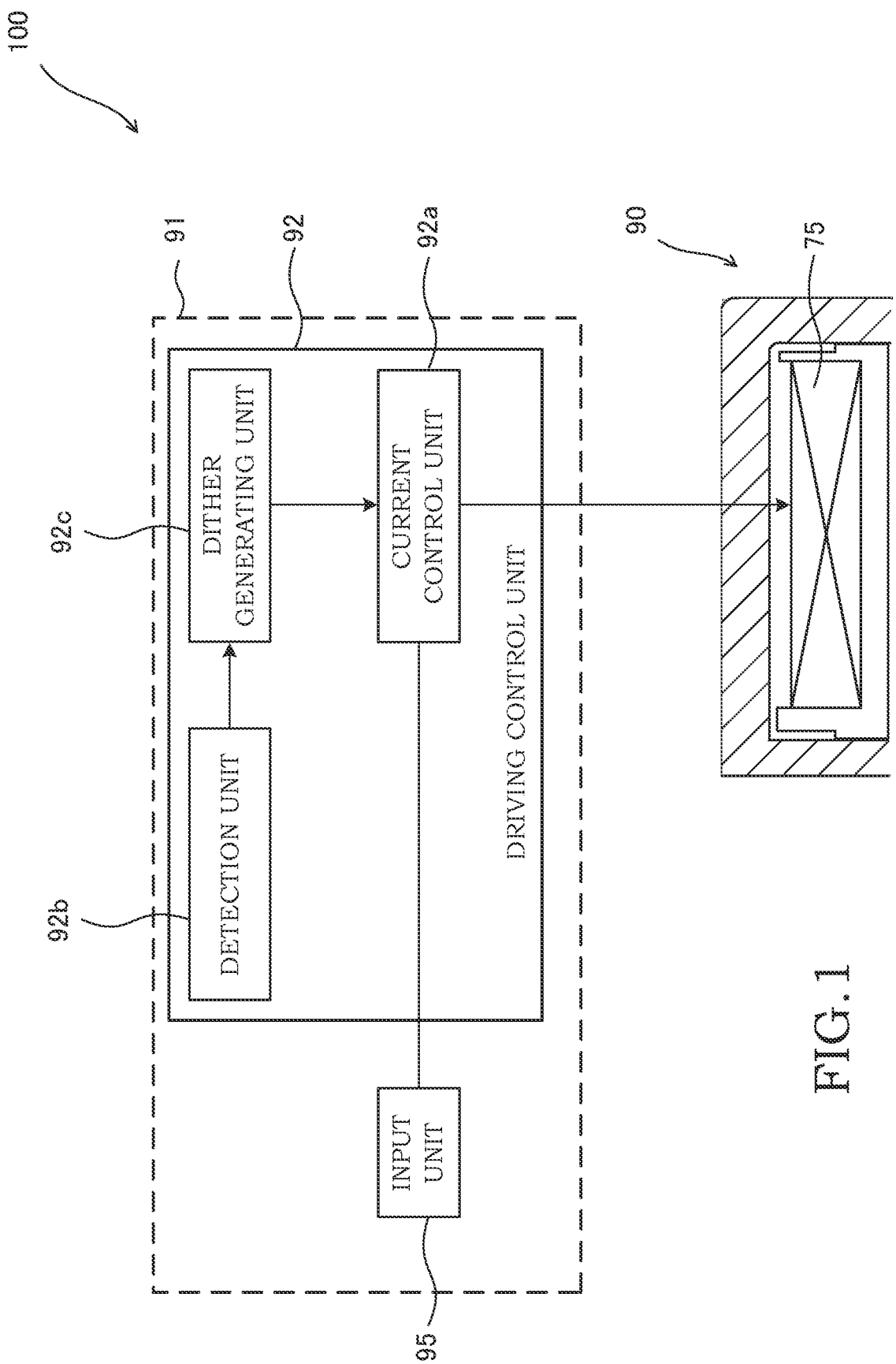
FIG. 1 is a schematic view of a solenoid relief valve system according to an embodiment of the present invention.
Figure 2:
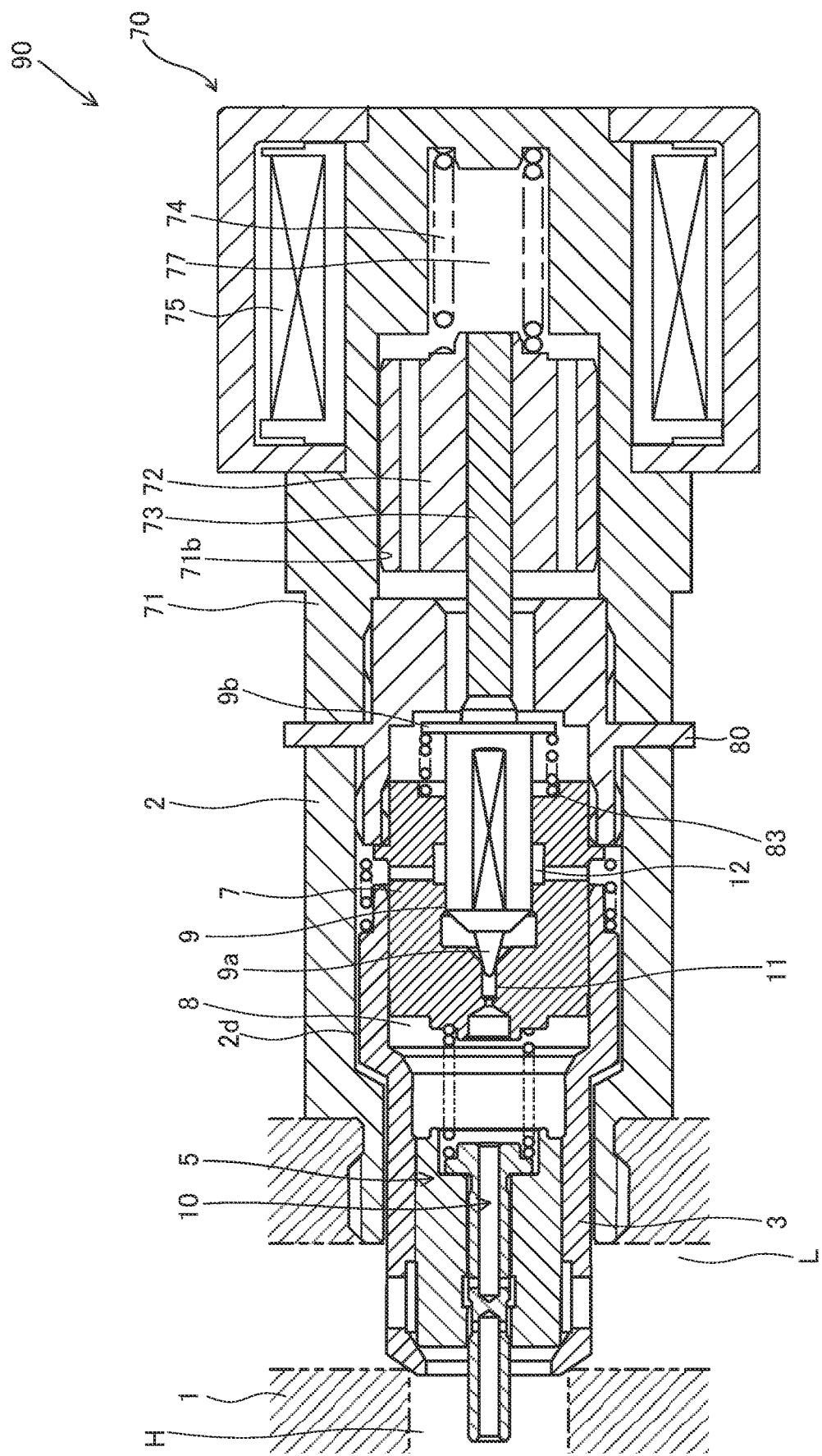
FIG. 2 is a sectional view of a solenoid relief valve according to the embodiment of the present invention.

As shown in FIGS. 1 and 2, the solenoid relief valve system 100 is provided with a solenoid relief valve 90 and a control unit 91 that controls the solenoid relief valve 90 (see FIG. 1). The solenoid relief valve 90 has a solenoid portion 70 (see FIG. 2) that adjusts a setting pressure at which the pilot poppet 9 is opened by changing a biasing force exerted by a spring 74 serving as a biasing member (see FIG. 2) acting on a pilot poppet 9 serving as a valve body (see FIG. 2). The solenoid relief valve system 100 is used, for example, in an operating machinery such as a power shovel, etc. In this embodiment, although a description will be given of a case in which the operating machinery is the power shovel, the solenoid relief valve system 100 may also be applied to other operating machineries.

Although not illustrated in the figures, the power shovel is provided with a travelling part of a crawler type, a rotating part that is provided on the travelling part so as to be rotatable, and an excavation part that is provided on the rotating part. The travelling part has a pair of crawlers on the left and right sides. The power shovel travels by driving the pair of crawlers on the left and right sides of the travelling part. The excavation part is provided with a boom that is rotatably attached to the rotating part, an arm that is rotatably attached to the boom, and a bucket that is rotatably attached to the arm. The solenoid relief valve 90 in this embodiment is attached to a boom cylinder for driving the boom to define a relief pressure of the boom cylinder. The solenoid relief valve 90 may also define the relief pressure of cylinders, etc. other than the boom cylinder. In addition, in this embodiment, although working oil is used as working fluid, other fluid such as working water, compressed air, and so forth may also be used.

The solenoid relief valve 90 will be described first with reference to FIG. 2.

The solenoid relief valve 90 is opened when the pressure of the working oil in a high-pressure passage H, which is in communication with an apparatus main body 1 that controls driving of the boom cylinder, etc., reaches the setting pressure and releases the working oil from the high-pressure passage H to a low-pressure passage L, and thereby, the pressure of the working oil in the high-pressure passage H is prevented from becoming abnormally high. In addition, as described below, by driving the solenoid portion 70, the solenoid relief valve 90 can change the setting pressure for opening it.

The solenoid relief valve 90 is provided with the pilot poppet 9 that is biased by the spring 74, the solenoid portion 70 that changes the biasing force, which is exerted by the spring 74, acting on the pilot poppet 9, a valve housing 2 that accommodates the pilot poppet 9, a solenoid housing 71 that accommodates the solenoid portion 70 and has an opening portion 71b into which a plunger 72 of the solenoid portion 70 is inserted, and a connecting member 80 that connects the valve housing 2 and the solenoid housing 71.

The valve housing 2 accommodates a suction poppet 3 having a bottomed-cylindrical shape, and the suction poppet 3 accommodates a main poppet 5 and a sleeve 7 accommodating the pilot poppet 9. The suction poppet 3 is seated between the high-pressure passage H and the low-pressure passage L, and the main poppet 5 is seated onto the suction poppet 3. With such a configuration, a communication between the high-pressure passage H and the low-pressure passage L via a gap between the apparatus main body 1 and the suction poppet 3 and a gap between the suction poppet 3 and the main poppet 5 is shut off. The main poppet 5 is provided with a pilot passage 10 through which the high-pressure passage H and a back pressure chamber 8 are communicated with each other. In the sleeve 7, a drain chamber 12 that communicates with the low-pressure passage L via a gap 2d between an outer circumferential surface of the suction poppet 3 and an inner circumferential surface of the valve housing 2 is formed. The drain chamber 12 communicates with the back pressure chamber 8 through a passage 11 formed in the sleeve 7. The sleeve 7 accommodates the pilot poppet 9 that opens/closes the passage 11 and that is supported slidably.

The pilot poppet 9 is a member formed to have a substantially columnar shape, has a valve portion 9a formed to have a conical shape on the one end, and has a flange portion 9b formed to project radially outward direction in an annular shape on the other end. The valve portion 9a of the pilot poppet 9 is seated onto the passage 11. A spring 83 that biases the pilot poppet 9 such that the other end of the pilot poppet 9 is brought into contact with a rod 73 of the solenoid portion 70, which will be described below, is provided between the flange portion 9b of the pilot poppet 9 and the sleeve 7.

The solenoid portion 70 has: a coil 75 that forms a magnetic field by the supply of the current; the plunger 72 that is provided inside the coil 75 by being accommodated in the solenoid housing 71 so as to be slidable and to which a thrust force against the biasing force of the spring 74 is exerted by the magnetic field formed by the coil 75; the rod 73 that is linked to the plunger 72 on the one end portion side and that comes into contact with the pilot poppet 9 on the other end portion thereof; and the spring 74 that is locked in the solenoid housing 71 and biases the pilot poppet 9 via the plunger 72. A housing that covers the coil 75 is also included in the solenoid housing 71.

In the solenoid housing 71, a spring chamber 77 is formed so as to communicate with the opening portion 71b in the axial direction. In the spring chamber 77, the spring 74 is arranged such that the one end thereof is locked to the plunger 72 and the other end thereof is locked to the solenoid housing 71. The biasing force exerted by the spring 74 acts on the pilot poppet 9 via the plunger 72 and the rod 73 that is linked to the axial center of the plunger 72. In other words, the spring 74 biases the pilot poppet 9 such that the valve portion 9a of the pilot poppet 9 is seated onto the passage 11.

The current is supplied from the control unit 91 to the coil 75 of the solenoid portion 70. When the current is supplied to the coil 75, the thrust force acts on the plunger 72 against the biasing force exerted by the spring 74. Thus, the biasing force exerted by the spring 74 acting on the pilot poppet 9 via the plunger 72 and the rod 73 is reduced, and as a result, the pressure required to separate the valve portion 9a of the pilot poppet 9 from the passage 11, a so-called cracking pressure, is lowered. As described above, by controlling the energization to the coil 75 to change the biasing force exerted by the spring 74 acting on the pilot poppet 9, it is possible to adjust the setting pressure of the solenoid relief valve 90, specifically, the setting pressure for opening the pilot poppet 9. In the following, the setting pressure of the solenoid relief valve 90 is also simply referred to as "the setting pressure".

With the solenoid relief valve 90 described above, when the pressure in the high-pressure passage H reaches the setting pressure, the pilot poppet 9 is opened. As the pilot poppet 9 is opened, the working oil in the back pressure chamber 8 flows to the drain chamber 12 through the passage 11 and is discharged to the low-pressure passage L through the gap 2d between the outer circumferential surface of the suction poppet 3 and the inner circumferential surface of the valve housing 2.

Next, the control unit 91 for controlling the solenoid relief valve 90 will be described with reference to FIG. 1.

The control unit 91 has a driving control unit 92 that supplies the current to the coil 75 and an input unit 95 with which adjusting operation of the setting pressure is performed by an operator.

The driving control unit 92 performs the control of the power shovel, and is formed of a microcomputer including a CPU (central processing unit), a ROM (a read-only memory), a RAM (a random-access memory), and an I/O interface (an input/output interface), and so forth. The RAM stores data from processing executed by the CPU, the ROM pre-stores a control program, etc. for the CPU, and the I/O interface is used for input/output of information to/from a connected device. The control of the power shovel is achieved by operating the CPU, the RAM, and the like in accordance with a program stored in the ROM. The driving control unit 92 is provided on a vehicle of the power shovel and controls the driving of the solenoid portion 70 during operation for civil engineering work, etc. and during adjustment of the setting pressure.

A desired setting pressure is input to the input unit 95 by the operator. The input unit 95 is, for example, a dial knob type member and the desired setting pressure is input by being rotated in the circumferential direction. The input unit 95 may be a touch panel, etc. with which the desired setting pressure can be input. The input unit 95 is connected to the driving control unit 92. As described below, the driving control unit 92 supplies the current to the coil 75 to control the setting pressure such that the desired setting pressure input to the input unit 95 is achieved.

The driving control unit 92 has a current control unit 92*a* that controls the current to be supplied to the coil 75, a detection unit 92*b* that detects the start and the end of the adjustment of the setting pressure, and a dither generating unit 92*c* that applies a dither signal to the current to be supplied to the coil 75 to generate the dither (vibration with small amplitude) to the plunger 72.

The current control unit 92*a* is formed of the electronic circuit employing the capacitor, the transistor, and so forth. The current control unit 92*a* is connected to the input unit 95 and generates a command signal on the basis of the pressure indicated by the input unit 95, in other words, the desired setting pressure input to the input unit 95. Specifically, for example, the driving control unit 92 stores, in advance, a relationship between the setting pressure and a current value to be supplied to the coil 75 to achieve the setting pressure. The current control unit 92*a* generates the command signal that is the current value to be supplied to the coil 75 from the desired setting pressure input to the input unit 95 and the relationship between the setting pressure and the current value that is stored in the driving control unit 92 in advance. As described below, the current control unit 92*a* generates a control signal on the basis of the command signal and supplies the current to the coil 75 according to the control signal to control the setting pressure such that the desired setting pressure input to the input unit 95 is achieved.

The detection unit 92*b* is formed of the electronic circuit employing the capacitor, the transistor, a timer, and so forth. The detection unit 92*b* detects switching of an ignition switch (not shown) to ON. Thereby, the detection unit 92*b* detects the start of an engine (not shown) of the power shovel. When the detection unit 92*b* detects the start of the engine, as described below, from a state in which the current is not supplied to the coil 75, the current is supplied to the coil 75 by the current control unit 92*a* such that the setting pressure becomes the pressure indicated by the input unit 95. By doing so, the solenoid relief valve 90 is started up. Note that, the detection unit 92*b* may detects the start of the engine by using a rotation speed sensor, etc.

In this embodiment, after the start-up of the solenoid relief valve 90, the detection unit 92*b* detects the start and the end of the adjustment of the setting pressure. In this specification, a phrase "the start and the end of the adjustment of the setting pressure" means to include not only the time period during which the current supplied to the coil 75 is actually changing, but also the time period set in advance for changing the current to be supplied to the coil 75. In other words, if it is within a predetermined time period set for adjusting the setting pressure, it is defined to be during the adjustment of the setting pressure even if the current is not actually changing. The detection unit 92*b* detects that a predetermined operation has been performed on the input unit 95 of the driving control unit 92 after the start-up of the solenoid relief valve 90. Specifically, the detection unit 92*b* detects that a displaced amount of the input unit 95 in the circumferential direction exceeded a predetermined value. As a result, the detection unit 92*b* detects the start of the adjustment of the setting pressure. In this specification, "a predetermined value" is set so as to be larger than the displaced amount of the input unit 95 that is assumed to be cause by unintended operation by the operator such as accidental touching to the input unit 95, etc. In addition, the detection unit 92*b* detects the end of the adjustment of the setting pressure when a predetermined time period has elapsed without operation of the input unit 95 after the detection of the start of the adjustment of the setting pressure. In this specification, "a predetermined time" is set so as to be shorter than the time period from the start of the adjustment of the setting pressure to the start of work by the power shovel. In other words, a state during the operation of the civil engineering work, etc. by the power shovel corresponds to a state after the end of the adjustment of the setting pressure has already been detected by the detection unit 92*b* or to a state before the start of the adjustment of the setting pressure is detected by the detection unit 92*b* with the setting pressure has not been changed after the start-up of the solenoid relief valve 90. A detection result of the detection unit 92*b* is output to the dither generating unit 92*c*. As described above, the time period until a predetermined time period has elapsed since a predetermined operation has been performed on the input unit 95 after the start-up of the solenoid relief valve 90 is the time period set for adjusting the setting pressure.

In addition, as described above, at the start-up time of the solenoid relief valve 90, from the state in which the current is not supplied to the coil 75, the current is supplied to the coil 75 by the current control unit 92*a* such that the setting pressure becomes the pressure indicated by the input unit 95. Thus, even though the input unit 95 of the driving control unit 92 is not operated, because the current supplied to the coil 75 is changed, the start-up of the solenoid relief valve 90 is included in "the adjustment of the setting pressure". At the start-up time of the solenoid relief valve 90, the detection unit 92*b* detects the end of the adjustment of the setting pressure. Specifically, the detection unit 92*b* detects the end of the adjustment of the setting pressure when a predetermined time period has elapsed after the detection of the start of the engine (in other words, after the start of the adjustment of the setting pressure). In this embodiment, the detection of the start of the engine by the detection unit 92*b* is different from the detection of the start of the adjustment of the setting pressure by the detection unit 92*b*. In addition, it suffices that "a predetermined time" is set so as to be shorter than the time period from the start of the adjustment of the setting pressure to the start of work by the power shovel, and it may be different from "a predetermined time" for the adjustment of the setting pressure after the start-up of the solenoid relief valve 90.

As described above, the detection unit 92*b* detects: the start of the engine; that a predetermined time period has elapsed since the start of the engine (the end of the adjustment of the setting pressure); that a predetermined operation has been performed on the input unit 95 (the start of the adjustment of the setting pressure); and that a predetermined time period has elapsed without the operation of the input unit 95 since a predetermined operation has been performed on the input unit 95 (the end of the adjustment of the setting pressure). At the start-up time of the solenoid relief valve 90, a period between the detection of the start of the engine by the detection unit 92*b* and the detection of the elapse of a predetermined time period corresponds to "the adjustment of the setting pressure". In addition, after the start-up of the solenoid relief valve 90, a period between the detection by the detection unit 92b that a predetermined operation has been performed on the input unit 95 and the detection of the elapse of a predetermined time period without the operation of the input unit 95 corresponds to "the adjustment of the setting pressure".

The dither generating unit 92c is the electronic circuit employing the capacitor, the transistor, and so forth. The dither generating unit 92c outputs either of a first dither signal or a second dither signal having a certain frequency and amplitude as parameters to the current control unit 92a of the driving control unit 92. In other words, the dither generating unit 92c applies either of the first dither signal or the second dither signal to the current to be supplied to the coil 75. The first dither signal and the second dither signal are used for applying the dither to the current to be supplied to the coil 75. As described below, the amplitude and frequency of the first dither signal are set such that the plunger 72 is vibrated in the axial direction in a state in which the current is supplied by the current control unit 92a to the coil 75 at the current value based on a first control signal. In addition, as described below, the amplitude and frequency of the second dither signal are set such that the plunger 72 is not displaced in a state in which the current is supplied by the current control unit 92a to the coil 75 at the current value based on a second control signal. In this embodiment, the second dither signal has the smaller amplitude than the first dither signal and has the same frequency as the first dither signal.

During the adjustment of the setting pressure, the dither generating unit 92c applies the first dither signal to the current to be supplied to the coil 75 from the current control unit 92a. Specifically, the dither generating unit 92c outputs the first dither signal to the current control unit 92a in a period until the end of the adjustment of the setting pressure is detected after a predetermined time period has elapsed since the start of the engine is detected by the detection unit 92b and in a period until the end of the adjustment of the setting pressure is detected after a predetermined time period has elapsed since the start of the adjustment of the setting pressure is detected by the detection unit 92b as a predetermined operation is performed on the input unit 95 after the start-up of the solenoid relief valve 90.

In addition, the dither generating unit 92c applies the second dither signal to the current to be supplied to the coil 75 from the current control unit 92a in a state in which the adjustment of the setting pressure is not performed. Specifically, the dither generating unit 92c outputs the second dither signal to the current control unit 92a after the end of the adjustment of the setting pressure is detected by the detection unit 92b and in a period until the start of the adjustment of the setting pressure is detected after the end of the adjustment of the setting pressure is detected by the detection unit 92b. In other words, during the operation of the civil engineering work, etc. by the power shovel, the dither generating unit 92c outputs the second dither signal to the current control unit 92a.

When the first dither signal is output from the dither generating unit 92c, the current control unit 92a generates a first combined signal by combining the command signal and the first dither signal. The current control unit 92a generates the first control signal while comparing the first combined signal and DC component of the actual current value and supplies the current to the coil 75 according to the first control signal. In this case, the thus-generated first control signal has the frequency and amplitude based on the first dither signal as the parameters, and the value is varied periodically. Therefore, the current to be supplied to the coil 75 will have the current value that is varied in accordance with the frequency. When the dither is applied according to the first dither signal to the current supplied to the coil 75, the plunger 72 is moved for the adjustment of the setting pressure while being vibrated in the axial direction. At the start-up time of the solenoid relief valve 90, the first dither signal is output from the dither generating unit 92c to the current control unit 92a, and the current control unit 92a supplies the current to the coil 75 according to the first control signal.

When the second dither signal is output from the dither generating unit 92c, the current control unit 92a generates a second combined signal by combining the command signal and the second dither signal. The current control unit 92a generates the second control signal while comparing the second combined signal and the DC component of the actual current value, and supplies the current to the coil 75 according to the second control signal. In this case, similarly to the first control signal, the value of the thus-generated second control signal is varied periodically. Therefore, the current to be supplied to the coil 75 will have the current value that is varied in accordance with the frequency. The second dither signal has the smaller amplitude than the first dither signal, and even if the dither is applied to the current to be supplied to the coil 75 according to the second dither signal, the plunger 72 is not displaced. In other words, in a state in which the current is supplied to the coil 75 according to the second control signal (a state in which the adjustment of the setting pressure is not performed), the plunger 72 is not displaced. The current control unit 92a in this embodiment generates the control signal as described above by the electronic circuit formed of hardware such as that using the capacitor, the transistor, and so forth.

Figure 3:
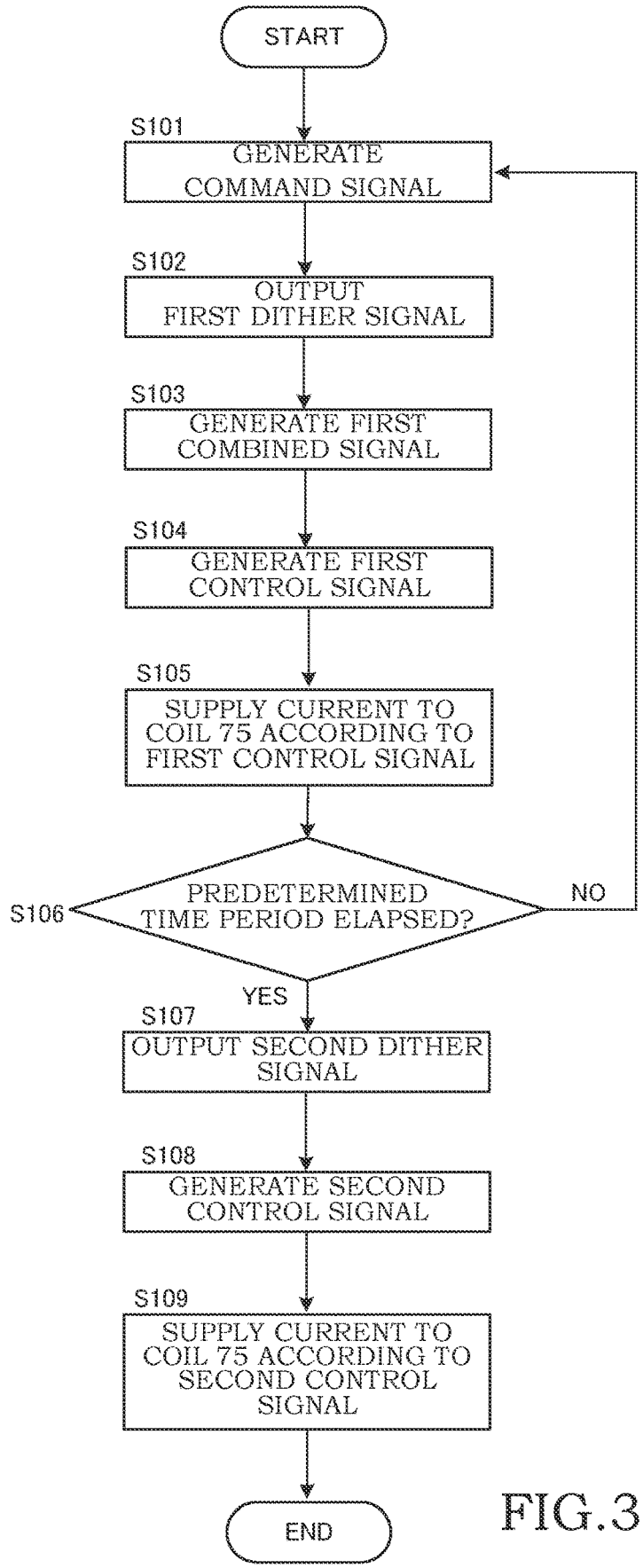
FIG. 3 is a flow chart showing the procedure performed when current is supplied to a coil by a control unit at the start-up of the solenoid relief valve.
Figure 4:
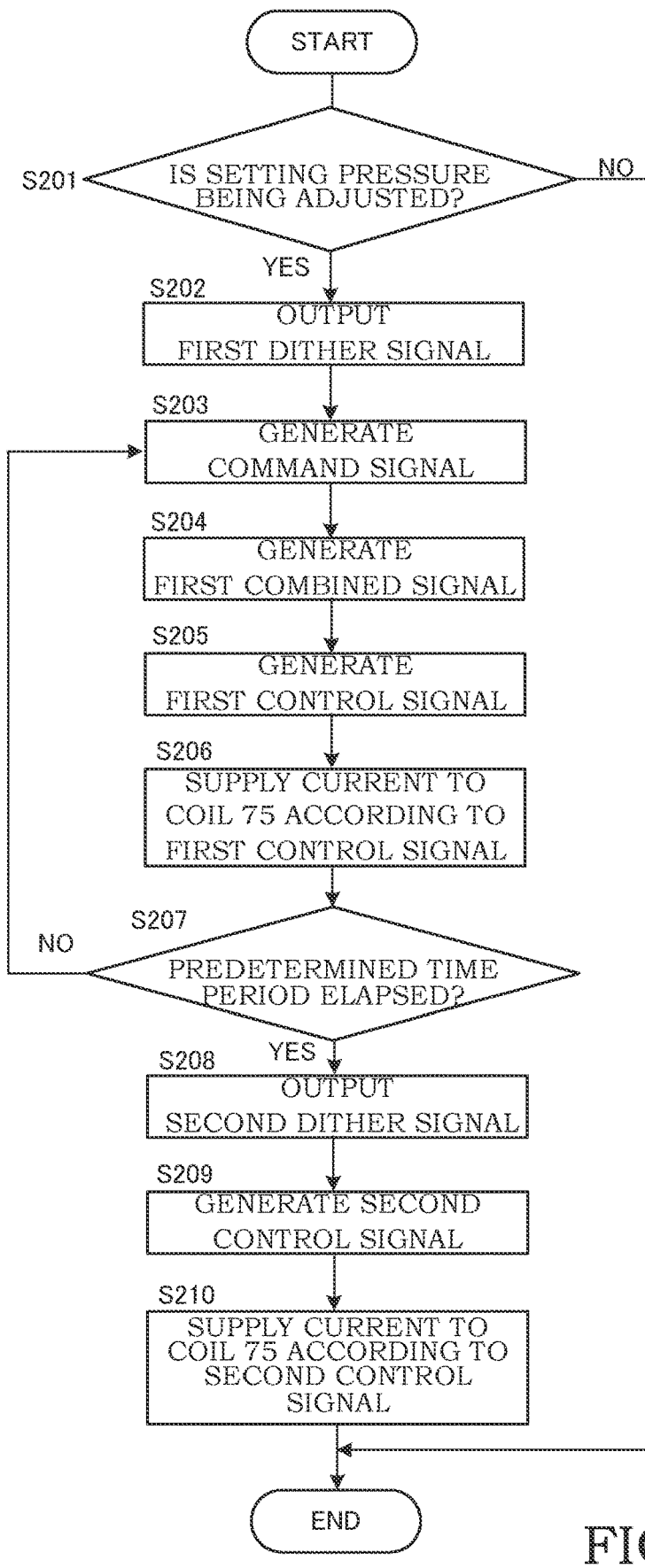
FIG. 4 is a flow chart showing the procedure performed when the current is supplied to the coil by the control unit after the start-up of the solenoid relief valve.

In FIGS. 3 and 4, the above-described procedures in which the control unit 91 supplies the current to the coil 75, in other words, the control methods of the solenoid relief valve 90 are summarized in the flow charts. FIG. 3 summarizes the control method of the solenoid relief valve 90 at the start-up time of the solenoid relief valve 90. FIG. 4 summarizes the control method of the solenoid relief valve 90 after the start-up of the solenoid relief valve 90. The control unit 91 starts up the solenoid relief valve 90 by first executing the processing shown in FIG. 3 after the detection of the start of the engine, and subsequently, executes the processing shown in FIG. 4 repeatedly at a predetermined time intervals.

As shown in FIG. 3, in Step S101, in the control unit 91, the current control unit 92a first generates the command signal that is the current value to be supplied to the coil 75 on the basis of the setting pressure indicated by the input unit 95. Next, the processing proceeds to Step S102, and the dither generating unit 92c outputs the first dither signal to the current control unit 92a. In the above, Step S101 may be performed after Step S102, or Step S101 and Step S102 may be performed in parallel. Then, the processing proceeds to Step S103, and the current control unit 92a generates the first combined signal by combining the thus-generated command signal and the first dither signal output from the dither generating unit 92c. Next, the processing proceeds to Step S104, and the current control unit 92a generates the first control signal on the basis of the first combined signal. Then, the processing proceeds to Step S105, and the current control unit 92a supplies the current to the coil 75 at the current value based on the first control signal. After the current is supplied to the coil 75, the processing proceeds to Step S106.

In Step S106, the detection unit 92*b* determines whether or not a predetermined time period has elapsed after the detection of the start of the engine. In the above, a period until a predetermined time period has elapsed after the detection of the start of the engine corresponds to a state in which the adjustment of the setting pressure is being performed and corresponds to a state before the detection unit 92*b* detects the end of the adjustment of the setting pressure. After a predetermined time period has elapsed after the detection of the start of the engine, it is a state in which the adjustment of the setting pressure is ended and is a state after the end of the adjustment of the setting pressure has been detected by the detection unit 92*b*.

In Step S106, when the detection unit 92*b* determines that a predetermined time period has not elapsed after the detection of the start of the engine, the processing returns to Step S101, and the command signal is generated again on the basis of the setting pressure indicated by the input unit 95, and the processing is continued. In other words, at the start-up time of the solenoid relief valve 90, if the setting pressure indicated by the input unit 95 is changed, the command signal is generated on the basis of the setting pressure that has been changed. In Step S106, when the detection unit 92*b* determines that a predetermined time period has elapsed after the detection of the start of the engine (in other words, the adjustment of the setting pressure is ended), the processing proceeds to Step S107, and the dither generating unit 92*c* outputs the second dither signal, instead of the first dither signal, to the current control unit 92*a*, and the processing proceeds to Step S108. In Step S108, similarly to the processing in Steps S103 and S104, the current control unit 92*a* generates the second control signal based on the second combined signal that has been generated by combining the command signal and the second dither signal. Then, the processing proceeds to Step S109, and the current control unit 92*a* supplies the current to the coil 75 at the current value based on the second control signal to terminate the start-up of the solenoid relief valve 90. Thereafter, the control of the solenoid relief valve 90 after the start-up of the solenoid relief valve 90, which is shown in FIG. 4, is executed at every predetermined time period. The control of the solenoid relief valve 90 after the start-up of the solenoid relief valve 90, which is shown in FIG. 4, is started in a state in which the current is supplied by the current control unit 92*a* to the coil 75 at the current value based on the second control signal.

As shown in FIG. 4, in Step S201, the control unit 91 determines whether or not the adjustment of the setting pressure, in which the current to be supplied to the coil 75 is caused to be changed, being performed. Specifically, the detection unit 92*b* determines whether the adjustment of the setting pressure is being performed or whether the adjustment of the setting pressure is not being performed. In Step S201, a phrase "the adjustment of the setting pressure being performed" refers to a state until the end of the adjustment of the setting pressure is detected since the start of the adjustment of the setting pressure is detected by the detection unit 92*b*. A phrase "the adjustment of the setting pressure is not being performed" refers to a state until the start of the adjustment of the setting pressure is detected by the detection unit 92*b* after the start-up of the solenoid relief valve 90 or a state until the start of the adjustment of the setting pressure is detected again since the end of the adjustment of the setting pressure is detected by the detection unit 92*b*. In Step S201, when the detection unit 92*b* determines that the adjustment of the setting pressure is not being performed, a state in which the current control unit 92*a* supplies the current to the coil 75 at the current value based on the second control signal is maintained, and the processing is terminated.

In Step S201, when the detection unit 92*b* determines that the adjustment of the setting pressure is being performed, the processing proceeds to Step S202, and the dither generating unit 92*c* outputs the first dither signal, instead of the second dither signal, to the current control unit 92*a*, and the processing proceeds to Step S203. In Step S203, similarly to the processing in Step S101, the current control unit 92*a* generates the command signal on the basis of the setting pressure indicated by the input unit 95, and the processing proceeds to Step S204. In Step S204, the first combined signal is generated by combining the thus-generated command signal and the first dither signal output from the dither generating unit 92*c*. Next, the processing proceeds to Step S205, and the current control unit 92*a* generates the first control signal on the basis of the first combined signal. Then, the processing proceeds to Step S206, and the current control unit 92*a* supplies the current to the coil 75 at the current value based on the first control signal. As the current is supplied to the coil 75, the processing proceeds to Step S207.

In Step S207, the detection unit 92*b* determines whether or not the end of the adjustment of the setting pressure is detected after a predetermined time period has elapsed since the start of the adjustment of the setting pressure is detected. In other words, the detection unit 92*b* determines whether or not the adjustment of the setting pressure is ended. In Step S207, when the detection unit 92*b* determines that a predetermined time period has not elapsed since the start of the adjustment of the setting pressure is detected, the processing returns to Step S204, and Steps S204 to S207 are repeated. In other words, a state in which the current is supplied to the coil 75 on the basis of the first control signal is maintained until it is determined that a predetermined time period has elapsed since the start of the adjustment of the setting pressure is detected in Step S207. At this time, in Step S204, the command signal is generated again on the basis of the setting pressure indicated by the input unit 95. In other words, after the start-up of the solenoid relief valve 90, if the setting pressure indicated by the input unit 95 is changed, the command signal is generated on the basis of the setting pressure that has been changed.

In Step S207, when the detection unit 92*b* determines that a predetermined time period has elapsed since the start of the adjustment of the setting pressure is detected, the processing proceeds to Step S208, and the dither generating unit 92*c* outputs the second dither signal, instead of the first dither signal, to the current control unit 92*a*, and the processing proceeds to Step S209. In Step S209, similarly to the processing in Steps S204 and S205, the current control unit 92*a* generates the second control signal based on the second combined signal that has been generated by combining the command signal and the second dither signal. Then, the processing proceeds to Step S210, and the current control unit 92*a* supplies the current to the coil 75 at the current value based on the second control signal, and the processing is terminated.

As described above, in the solenoid relief valve system 100 of this embodiment, the solenoid relief valve 90 is controlled by: a command signal generating step (Step S101, Step S203) in which the command signal that is the current value to be supplied to the coil 75 is generated by the control unit 91 on the basis of the desired setting pressure input by the operator; and a current supply step (Steps S107 to S109, Steps S208 to S210) in which the current is supplied to the coil 75 at the current value based on the first dither signal and the command signal during the adjustment of the setting pressure, in which the current to be supplied to the coil 75 is caused to be changed (Steps S102 to S105, Step S202, Steps S204 to S206), and in which the current is supplied to the coil 75 at the current value based on the second dither signal and the command signal in a state in which the adjustment of the setting pressure is not performed (in other words, a state in which the adjustment of the setting pressure is ended).

Figure 5:
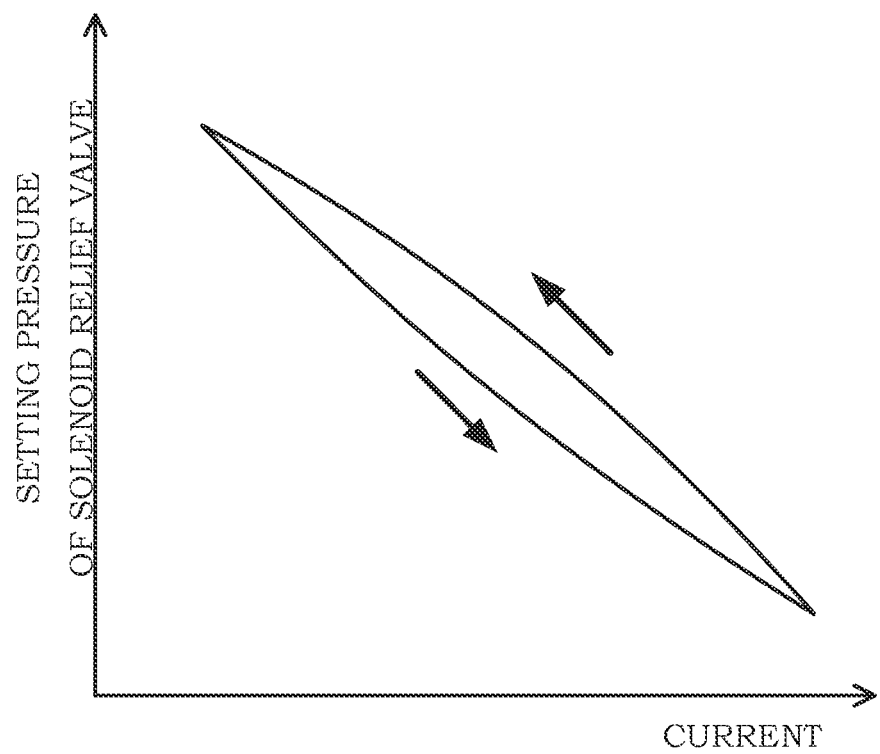
FIG. 5 is a diagram showing a relationship between the current supplied to the coil and a setting pressure of the solenoid relief valve in a state in which dither is not generated at a plunger of a solenoid portion.

In the solenoid relief valve system, as shown in FIG. 5, when the setting pressure of the solenoid relief valve is adjusted without applying the dither to the current to be supplied to the coil, due to static friction acting on the sliding surface of the plunger, there is a risk in that hysteresis is caused when the setting pressure is adjusted. As a result, the setting pressure of the solenoid relief valve that is actually set at the adjustment of the setting pressure may be varied. Specifically, as indicated by arrows in FIG. 5, the setting pressure of the solenoid relief valve is different even when the current value is the same between a case when the current supplied to the solenoid portion is increased and a case when the current is decreased.

Furthermore, in the solenoid relief valve system, if the setting pressure of the solenoid relief valve is adjusted without applying the dither to the current to be supplied to the coil, there is a risk in that the hysteresis is caused during the adjustment of the setting pressure due to variation caused in the relationship between the intensity of the magnetic field generated by the supply of the current to the coil and the thrust force of the plunger generated by the magnetic field acting against the biasing force of the spring.

In contrast, in the solenoid relief valve system 100 of this embodiment, when the setting pressure is being adjusted, the dither generating unit 92c applies the dither to the current to be supplied to the coil 75 according to the first dither signal. As a result, a state in which the plunger 72 is vibrated in the axial direction with a kinetic friction is achieved during the adjustment of the setting pressure, and so, compared with a case in which the plunger 72 is stationary, the frictional force acting on the sliding surface is reduced. Thus, the occurrence of the hysteresis during the adjustment of the setting pressure is suppressed. Furthermore, by causing the plunger 72 to generate the dither, the variation in the relationship between the intensity of the magnetic field generated by the supply of the current to the coil 75 and the thrust force of the plunger 72 generated by the magnetic field acting against the biasing force of the spring 74 is reduced. As a result, the occurrence of the hysteresis (magnetic hysteresis) during the adjustment of the setting pressure is suppressed further. Thus, it is possible to reduce the variation in the set pressure in the solenoid relief valve 90. Furthermore, because the occurrence of the magnetic hysteresis during the adjustment of the setting pressure is suppressed, it is possible to lower the level of the current during the adjustment of the setting pressure.

In addition, because the vibration of the plunger 72 is transmitted to the pilot poppet 9 via the rod 73, if the plunger 72 is vibrated during the civil engineering work by the power shovel, there is a risk in that the operation of the solenoid relief valve 90 becomes unstable. However, in the solenoid relief valve system 100 of this embodiment, in a state in which the adjustment of the setting pressure is not performed, the dither is applied to the current to be supplied to the coil 75 according to the second dither signal having the smaller amplitude than the first dither signal. Thus, by applying the small dither (specifically, the dither is applied to the extent that does not cause the displacement of the plunger 72) to the current to be supplied to the coil 75, the operation of the solenoid relief valve 90 is stabilized, and at the same time, the variation in the relationship between the amount of supply of the current to the coil 75 and the thrust force of the plunger 72 exerted against the biasing force exerted by the spring 74 is reduced, and thereby, the occurrence of the hysteresis during the adjustment of the setting pressure is suppressed. As described above, with the solenoid relief valve system 100, it is possible to reduce the variation in the set pressure in the solenoid relief valve 90 and to stabilize the operation thereof.

According to the above-described embodiment, following operational advantages are afforded.

With the solenoid relief valve system 100, if the setting pressure is being adjusted, the dither generating unit 92c applies the dither to the current to be supplied to the coil 75 according to the first dither signal. As a result, because a state in which the plunger 72 is vibrated with the kinetic friction is achieved during the adjustment of the setting pressure, it is possible to reduce the variation in the set pressure in the solenoid relief valve 90. Furthermore, with the solenoid relief valve system 100, in a state in which the adjustment of the setting pressure is not performed, the dither generating unit 92c applies the dither to the current to be supplied to the coil 75 according to the second dither signal having the smaller amplitude than the first dither signal. By applying the smaller dither to the current to be supplied to the coil 75, it is possible to reduce the variation in the set pressure in the solenoid relief valve 90 and to stabilize the operation thereof.

Following modifications also fall within the scope of the present invention, and it is also possible to combine the configurations shown in the modifications with the configurations described in the above-described embodiment, and to combine the configurations described in the following different modifications with each other.

<First Modification>

In the above-mentioned embodiment, the input unit 95 is the dial knob type member, and the detection unit 92b detects the start of the adjustment of the setting pressure when the displaced amount of the input unit 95 in the circumferential direction exceeds a predetermined value after the start-up of the solenoid relief valve 90. The configuration is not limited thereto, and the input unit 95 may also be the touch panel, etc. When the input unit 95 is the touch panel, the detection unit 92b detects the start of the adjustment of the setting pressure when the setting pressure different from the current setting pressure is input after the start-up of the solenoid relief valve 90 and detects the end of the adjustment of the setting pressure when a predetermined time period has elapsed after the input of the different setting pressure is completed. In addition, a switch (not shown) to be pressed down at the adjustment of the setting pressure may be provided near the input unit 95, and the detection unit 92b may detect the start of the adjustment of the setting pressure when the switch is turned ON. In this case, the detection unit 92b detects the end of the adjustment of the setting pressure when a predetermined time period has elapsed since the switch is turned OFF or since the switch is turned ON. In this case, the operator may be notified that the switch is being turned ON by a lamp, etc.

Also with this configuration, similarly to the above-mentioned embodiment, it is possible to reduce the variation in the set pressure in the adjustment of the setting pressure of the solenoid relief valve 90. For example, this configuration can also be applied in a case in which the actuator is replaced or in a case in which the relief pressure of the actuator is changed according to details of the work.

<Second Modification>

In the above-mentioned embodiment, the second dither signal have the smaller amplitude than the first dither signal, and even if the dither is applied to the current to be supplied to the coil 75 according to the second dither signal, the plunger 72 is not displaced. The configuration is not limited thereto, and the second dither signal may have the larger frequency than the first dither signal. When the frequency of the second dither signal is made larger, a responsiveness of the plunger 72 for the periodic variation in the current to be supplied to the coil 75 is lowered. Therefore, similarly to the above-mentioned embodiment, it is possible to achieve the configuration in which the plunger 72 is not displaced even if the dither is applied to the current to be supplied to the coil 75 according to the second dither signal. With such a configuration, the similar effects as those of the above-mentioned embodiment can be afforded.

<Third Modification>

In the above-mentioned embodiment, the detection unit 92b detects the end of the adjustment of the setting pressure when a predetermined time period has elapsed after the detection of the start of the engine (after the start of the adjustment of the setting pressure) or when a predetermined time period has elapsed without the operation of the input unit 95 after the detection of the start of the adjustment of the setting pressure. The configuration is not limited thereto, and a switch (not shown) to be pressed down when the adjustment of the setting pressure is ended may be provided near the input unit 95, and the detection unit 92b may detect the end the adjustment of the setting pressure when the switch is operated. Even with this configuration, the similar effects as those of the above-mentioned embodiment can be afforded. The detection unit 92b may be set so as to detect the end of the adjustment of the setting pressure when a predetermined time period has elapsed after the detection of the start of the adjustment of the setting pressure, and thereby, even if the operator forgets, for example, to operate the switch for detecting the end of the adjustment of the setting pressure, the application of the first dither signal to the current to be supplied to the plunger 72 during the operation of the solenoid relief valve 90 is prevented.

<Forth Modification>

In the above-mentioned embodiment, the current control unit 92a and the dither generating unit 92c are the electronic circuits employing the capacitor, the transistor, and so forth, in other words, the hardware, and the control signal and the dither signal are generated by the electronic circuit. The configuration is not limited thereto, and the current control unit 92a and the dither generating unit 92c may generate the control signal and the dither signal as in the above-mentioned embodiment by using a software. Specifically, the electronic circuit may be replaced with a program of the software, and the control signal may be generated by the processing of the program. Even with this configuration, the similar effects as those of the above-mentioned embodiment can be afforded.

<Fifth Modification>

In the above-mentioned embodiment, the driving control unit 92 has the current control unit 92a, the detection unit 92b, and the dither generating unit 92c. The configuration is not limited thereto, and the detection unit 92b and the dither generating unit 92c may be provided separately from the driving control unit 92 and may be provided separately from the vehicle of the power shovel. In other words, it suffices that the solenoid relief valve system 100 has a configuration in which at least the control unit 91 has the driving control unit 92, the detection unit 92b, and the dither generating unit 92c. Furthermore, as long as the configuration in which the dither generating unit 92c applies the first dither signal to the current during the adjustment of the setting pressure and applies the second dither signal to the current in a state in which the adjustment of the setting pressure is not performed is employed, it is not essential for the detection unit 92b to detect the start and the end of the adjustment of the setting pressure. In other words, the detection unit 92b is not the essential configuration of the solenoid relief valve system 100.

The configurations, operations, and effects of the embodiments of the present invention configured as described above will be collectively described.

The solenoid relief valve system 100 includes: the solenoid relief valve 90 having the solenoid portion 70 configured to adjust the setting pressure for opening the pilot poppet 9 serving as the valve body by changing the biasing force exerted by the spring 74 serving as the biasing member acting on the pilot poppet 9; and the control unit 91 configured to control the solenoid relief valve 90, wherein the solenoid portion 70 has: the coil 75 configured to form the magnetic field by the supply of the current; and the plunger 72 slidably accommodated in the solenoid housing 71, the plunger 72 being configured such that the thrust force against the biasing force of the spring 74 is exerted to the plunger 72 by the magnetic field formed by the coil 75, the control unit 91 has: the driving control unit 92 configured to supply the current to the coil 75 of the solenoid portion 70; and the dither generating unit 92c configured to generate the dither to the plunger 72 by applying the first dither signal or the second dither signal having different amplitude or frequency from the first dither signal to the current to be supplied to the coil 75, and wherein the dither generating unit 92c is configured to apply the first dither signal to the current to be supplied to the coil 75 from the driving control unit 92 during the adjustment of the setting pressure, in which the current to be supplied to the coil 75 from the driving control unit 92 is caused to be changed, and configured to apply the second dither signal to the current to be supplied to the coil 75 from the driving control unit 92 in a state in which the adjustment of the setting pressure is not performed.

With such a configuration, when the setting pressure for opening the pilot poppet 9 is being adjusted, the dither generating unit 92c applies the dither to the current to be supplied to the coil 75 according to the first dither signal. By doing so, because a state in which the plunger 72 is vibrated with the kinetic friction is achieved during the adjustment of the setting pressure, compared with a case in which the plunger 72 is stationary, the frictional force acting on the sliding surface is reduced. Thus, it is possible to reduce the variation in the set pressure that is actually set at the adjustment of the setting pressure in the solenoid relief valve 90. Furthermore, with the solenoid relief valve system 100, in a state in which the adjustment of the setting pressure is not performed, the dither generating unit 92c applies the dither to the current to be supplied to the coil 75 according to the second dither signal. By doing so, it is possible to reduce the variation in the set pressure in the solenoid relief valve 90 and to stabilize the operation thereof.

In the solenoid relief valve system 100, the second dither signal has the smaller amplitude than the first dither signal.

In the solenoid relief valve system 100, the second dither signal has the larger frequency than the first dither signal.

With these configurations, it is possible to reduce the variation in the set pressure in the solenoid relief valve 90 and to stabilize the operation thereof.

In the solenoid relief valve system 100, the control unit 91 further has the detection unit 92b configured to detect the start and the end of the adjustment of the setting pressure.

With such a configuration, by detecting the start and the end of the adjustment of the setting pressure by the detection unit 92b and by controlling the application of the first dither signal or the second dither signal by the dither generating unit 92c, it is possible to reduce the variation in the set pressure in the solenoid relief valve 90 and to stabilize the operation thereof.

In the solenoid relief valve system 100, the detection unit 92b detects the end of the adjustment of the setting pressure when a predetermined time period has elapsed after the start of the adjustment of the setting pressure.

With such a configuration, even if the operator forgets, for example, to operate the switch for detecting the end of the adjustment of the setting pressure, the application of the first dither signal to the current to be supplied to the plunger 72 during the operation of the solenoid relief valve 90 is prevented.

The control method of the solenoid relief valve 90 having the solenoid portion 70 configured to adjust the setting pressure for opening the pilot poppet 9 by changing the biasing force of the spring 74 acting on the pilot poppet 9 is provided, wherein the solenoid portion 70 has: the coil 75 configured to form the magnetic field by supply of the current; and the plunger 72 slidably accommodated in the solenoid housing 71, the plunger 72 being configured such that the thrust force against the biasing force of the spring 74 is exerted to the plunger 72 by the magnetic field formed by the coil 75, and wherein the control method of the solenoid relief valve 90 includes: the command signal generating step (Step S101, Step S203) of generating the command signal that is the current value to be supplied to the coil 75 by the control unit 91 on the basis of the desired setting pressure input by the operator; and the current supply step (Steps S107 to S109, Steps S208 to S210) of supplying the current to the coil 75 at the current value based on the first dither signal and the command signal during the adjustment of the setting pressure, in which the current to be supplied to the coil 75 is caused to be changed (Steps S102 to S105, Step S202, Steps S204 to S206), and supplying the current to the coil 75 at the current value based on the second dither signal and the command signal in a state in which the adjustment of the setting pressure is not performed, the second dither signal having different amplitude or frequency from the first dither signal.

With such a configuration, it is possible to reduce the variation in the set pressure that is actually set at the adjustment of the setting pressure in the solenoid relief valve 90 and to stabilize the operation of the solenoid relief valve 90.

The embodiments of the present invention described above are merely illustration of some application examples of the present invention and the technical scope of the present invention is not limited to the specific constructions of the above embodiments.

The invention claimed is:

1. A solenoid relief valve system comprising:
a solenoid relief valve having a solenoid portion configured to adjust a setting pressure for opening a valve body by changing a biasing force of a biasing member acting on the valve body; and
a control unit configured to control the solenoid relief valve, wherein
the solenoid portion has:
a coil configured to form a magnetic field by supply of current; and
a plunger slidably accommodated in a housing, the plunger being configured such that a thrust force against the biasing force of the biasing member is exerted to the plunger by the magnetic field formed by the coil,
the control unit has:
a driving control unit configured to supply the current to the coil of the solenoid portion; and
a dither generating unit configured to generate dither on the plunger by applying a first dither signal or a second dither signal to the current to be supplied to the coil, the second dither signal having different amplitude or frequency from the first dither signal, and wherein
the dither generating unit is configured to apply the first dither signal to the current to be supplied to the coil from the driving control unit during adjustment of the setting pressure, in which the current to be supplied to the coil from the driving control unit is caused to be changed, and configured to apply the second dither signal to the current to be supplied to the coil from the driving control unit in a state in which the adjustment of the setting pressure is not performed.

2. The solenoid relief valve system according to claim 1, wherein
the second dither signal has smaller amplitude than the first dither signal.

3. The solenoid relief valve system according to claim 1, wherein
the second dither signal has larger frequency than the first dither signal.

4. The solenoid relief valve system according to claim 1, wherein
the control unit further has a detection unit configured to detect start and end of the adjustment of the setting pressure.

5. The solenoid relief valve system according to claim 4, wherein
the detection unit is configured to detect the end of the adjustment of the setting pressure when a predetermined time period has elapsed after the start of the adjustment of the setting pressure.

6. A control method of a solenoid relief valve having a solenoid portion configured to adjust a setting pressure for opening a valve body by changing a biasing force of a biasing member acting on the valve body, wherein
the solenoid portion has: a coil configured to form a magnetic field by supply of current; and a plunger slidably accommodated in a housing, the plunger being configured such that a thrust force against the biasing force of the biasing member is exerted to the plunger by the magnetic field formed by the coil, and wherein
the control method of the solenoid relief valve comprising:
a command signal generating step of generating a command signal that is the current to be supplied to the coil based on a desired setting pressure input by an operator; and
a current supply step of supplying current to the coil at a current value based on a first dither signal and the command signal during adjustment of the setting pressure, in which the current to be supplied to the coil is caused to be changed, and supplying current to the coil at a current value based on a second dither signal and the command signal in a state in which the adjustment of the setting pressure is not performed, the second dither signal having different amplitude or frequency from the first dither signal.

* * * * *